United States Patent
Akhoundi

(10) Patent No.: US 11,625,880 B2
(45) Date of Patent: Apr. 11, 2023

(54) MACHINE-LEARNING MODELS FOR TAGGING VIDEO FRAMES

(71) Applicant: Electronic Arts Inc., Redwood City, CA (US)

(72) Inventor: Elaheh Akhoundi, Vancouver (CA)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 17/171,240

(22) Filed: Feb. 9, 2021

(65) Prior Publication Data

US 2022/0254083 A1 Aug. 11, 2022

(51) Int. Cl.
*G06T 13/40* (2011.01)
*G06F 17/18* (2006.01)
*G06N 3/04* (2023.01)

(52) U.S. Cl.
CPC .............. *G06T 13/40* (2013.01); *G06F 17/18* (2013.01); *G06N 3/0454* (2013.01)

(58) Field of Classification Search
CPC ....... G06T 13/40; G06F 17/18; G06F 16/683; G06N 3/0454; G06N 3/08; G06N 3/0445; G06N 3/049; G06N 7/005; G10L 15/16; G10L 15/08; G10L 25/30; G10L 15/26; G10L 2015/088; G08B 13/1672; G11B 27/28
See application file for complete search history.

(56) References Cited

U.S. PATENT DOCUMENTS

| | | | |
|---|---|---|---|
| 10,600,408 B1 * | 3/2020 | Smith | G10L 13/10 |
| 10,650,245 B2 * | 5/2020 | Swaminathan | H04N 21/8456 |
| 2004/0260550 A1 * | 12/2004 | Burges | G10L 17/00 |
| | | | 704/259 |
| 2014/0247926 A1 * | 9/2014 | Gainsboro | G10L 15/26 |
| | | | 379/88.01 |
| 2016/0379638 A1 * | 12/2016 | Basye | G10L 15/22 |
| | | | 704/235 |
| 2018/0122114 A1 * | 5/2018 | Luan | G06T 7/11 |
| 2018/0173958 A1 * | 6/2018 | Hu | G06K 9/6271 |
| 2019/0384807 A1 * | 12/2019 | Dernoncourt | G06N 3/08 |
| 2020/0134316 A1 * | 4/2020 | Krishnamurthy | A63F 13/60 |
| 2020/0135052 A1 * | 4/2020 | Singh | A63F 13/52 |
| 2021/0097649 A1 * | 4/2021 | Liu | G06T 5/002 |
| 2021/0097718 A1 * | 4/2021 | Fisch | G06N 3/084 |
| 2021/0216880 A1 * | 7/2021 | Jin | G06F 16/36 |

(Continued)

FOREIGN PATENT DOCUMENTS

WO WO-2019166296 A1 * 9/2019 ........... G06F 16/683

*Primary Examiner* — Abderrahim Merouan
(74) *Attorney, Agent, or Firm* — Gray Ice Higdon

(57) ABSTRACT

According to a first aspect of this specification, there is described a computer-implemented method of tagging video frames. The method comprises generating, using a frame tagging model, a tag for each of a plurality of frames of an animation sequence. The frame tagging model comprises: a first neural network portion configured to process, for each frame of the plurality of frames, a plurality of features associated with the frame and generate an encoded representation for the frame. The frame tagging model further comprises a second neural network portion configured to receive input comprising the encoded representations of each frame and generate output indicative of a tag for each of the plurality of frames.

17 Claims, 13 Drawing Sheets

(56) References Cited

U.S. PATENT DOCUMENTS

| | | | |
|---|---|---|---|
| 2021/0233328 A1* | 7/2021 | Krishnamurthy | G06N 3/084 |
| 2022/0093270 A1* | 3/2022 | Gheorghita | G06V 10/82 |
| 2022/0254083 A1* | 8/2022 | Akhoundi | G06N 3/0454 |

* cited by examiner

MACHINE-LEARNING MODELS FOR TAGGING VIDEO FRAMES

BACKGROUND

In many fields where video frames are displayed, such as in video games, it is useful to provide information about individual video frames, which information may be used when the video frames are displayed. For example, individual video frames of a video game (or relevant features thereof, such as data characterizing the configurations of one or more entities that are to be portrayed in the video frame) may be tagged with one or more audio tags, wherein each audio tag is associated with corresponding audio data that is appropriately outputted by the video game. However, manually tagging individual video frames is a time-consuming process.

SUMMARY

According to a first aspect of this specification, there is described a computer-implemented method of tagging video frames. The method comprises generating, using a frame tagging model, a tag for each of a plurality of frames of an animation sequence. The frame tagging model comprises: a first neural network portion configured to process, for each frame of the plurality of frames, a plurality of features associated with the frame and generate an encoded representation for the frame. The frame tagging model further comprises a second neural network portion configured to receive input comprising the encoded representations of each frame and generate output indicative of a tag for each of the plurality of frames.

The input to the second portion of the frame tagging model may further comprise the plurality of frames of the animation sequence, wherein the encoded representation of each of the frames of the animation sequence is concatenated with the plurality of features associated with the frame prior to input into the second portion of the frame tagging model.

The first portion of the frame tagging model may comprise one or more recurrent neural network layers and/or one or more convolutional neural network layers.

The second portion of the frame tagging model may comprise one or more recurrent neural network layers. The second portion of the frame tagging model may further comprise, subsequent to the one or more recurrent neural network layers, one or more dense layers and a softmax layer, wherein the softmax layer outputs, for each frame in the animation sequence of the video game, a probability distribution over a plurality of tags.

The plurality of features associated with each frame may comprise positions and/or velocities for one or more keypoints of one or more objects of the video game present in the plurality of frames. The one or more keypoints may comprise one or more joints of a skeletal frame for one or more entities of the video game.

The tag for each frame may comprises an audio tag out of a set of audio tags, and wherein the set of audio tags includes a blank audio tag.

The method may further comprise: displaying, using a display device, the plurality of frames of an animation sequence of the video game during a video game session; and causing output of audio associated with an audio tag from an audio device when a frame associated with the audio tag is displayed.

According to a further aspect of this specification, there is described a non-transitory computer-readable medium containing instructions, which when executed by one or more processors, causes the one or more processors to perform a method of determining audio tags for frames of a video game comprising: sequentially inputting a sequence of video frames of an animation from a video game into a neural network model; processing the sequence of video frames through a plurality of neural network layers; and outputting, from the neural network and based on the processed sequence of video frames, data indicative of an audio tag for each of the video frames. The neural network comprises one or more recurrent neural network layers.

The neural network may further comprise, subsequent to the one or more recurrent neural network layers, one or more dense layers and a softmax layer, wherein the softmax layer outputs, for each frame in the animation sequence of the video game, a probability distribution over a plurality of tags.

The one or more recurrent neural network layers may comprise a long short-term memory layer.

Sequentially inputting the sequence of video frames into the neural network may comprise: concatenating each video frame with an encoded representation of features extracted from that video frame to form a set of input data; and inputting the input data into the neural network. The method may further comprise, for each of the video frames, generating the encoded representation of features of the video frame by applying a further neural network to features extracted from the video frame. The further neural network may comprise a recurrent neural network or a convolutional neural network. The features extracted from the video frame may comprise positions and/or velocities for one or more keypoints of one or more objects of the video game present in the plurality of frames. The one or more keypoints may comprise one or more joints of a skeletal frame for one or more entities of the video game.

The method may further comprise: displaying, using a display device, the plurality of frames of an animation sequence of the video game during a video game session; and causing output of audio associated with an audio tag from an audio device when a frame associated with the audio tag is displayed.

According to a further aspect of this specification, there is described a computer-implemented method of determining audio tags of video frames for a video game, the method comprising: determining, for each frame in a plurality of frames of an animation sequence of the video game, whether said frame is associated with a blank audio tag or a non-blank audio tag using a binary classifier; and determining, for each of the frames determined to be associated with a non-blank audio tag, an identity of the non-blank audio tag using a multiclass classifier.

The multiclass classifier may comprise a neural network. The method may further comprise: sequentially input a sequence of video frames of an animation from a video game into the neural network model; processing the sequence of video frames through a plurality of neural network layers; and outputting, from the neural network and based on the processed sequence of video frames, data indicative of an audio tag for each of the video frames. The neural network may comprise one or more recurrent neural network layers.

GENERAL DEFINITIONS

The following terms are defined to aid the present disclosure and not limit the scope thereof.

A "user" or "player", as used in some embodiments herein, is preferably used to connote to an individual and/or the computing system(s) or device(s) corresponding to (e.g., associated with, operated by) that individual.

A "client", as used in some embodiments described herein, preferably used to connote a software application with which a user interacts, and which can be executed on a computing system or device locally, remotely, or over a cloud service.

A "server", as used in some embodiments described here, is preferably used to connote a software application configured to provide certain services to a client, e.g. content and/or functionality.

A "video game", as used in some embodiments described herein, is preferably used to connote a virtual interactive environment in which players engage. Video game environments may be facilitated through a client-server framework in which a client may connect with the server to access at least some of the content and functionality of the video game.

DETAILED DESCRIPTION

Overview

Figure 1:
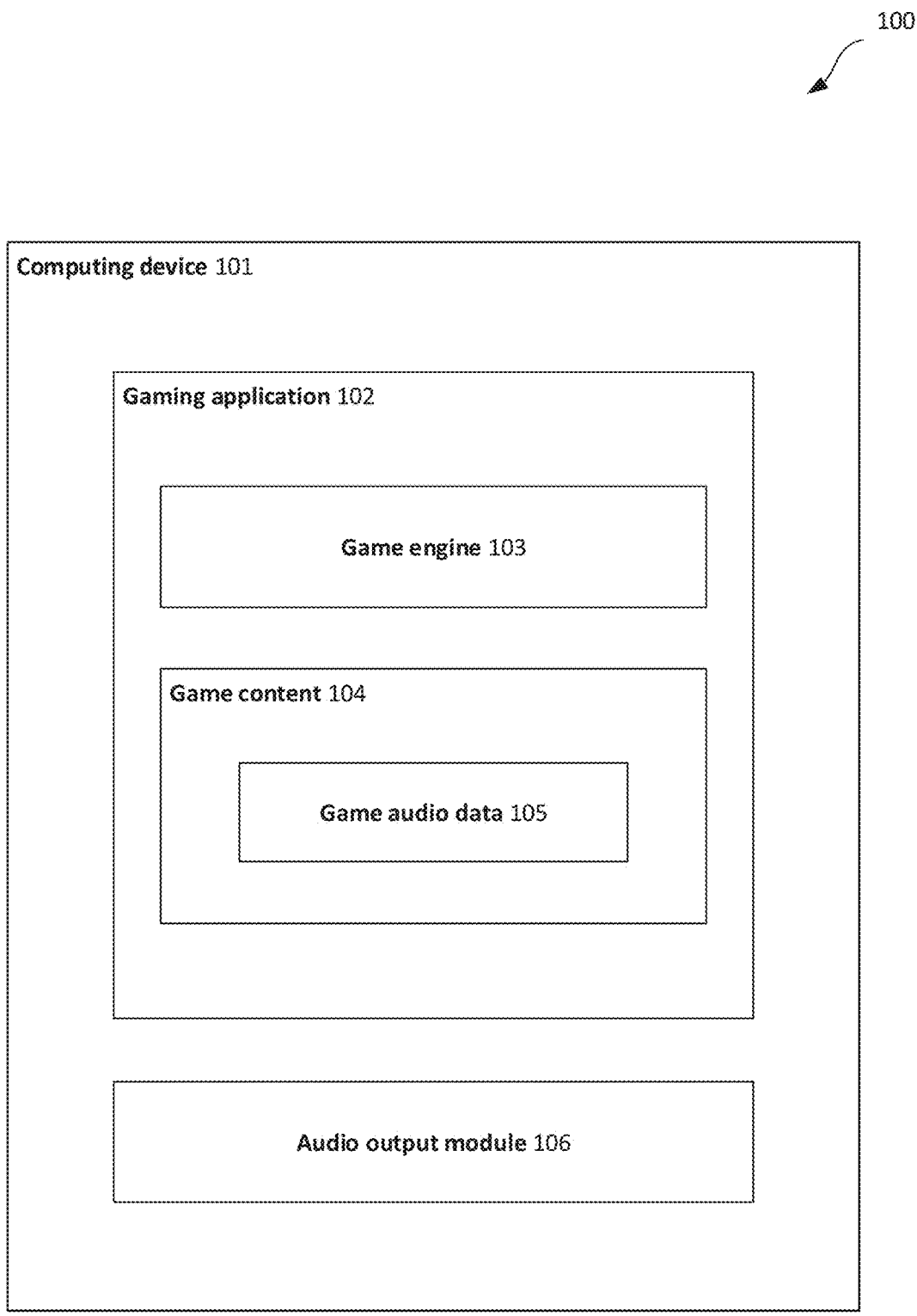
FIG. 1 is a schematic block diagram illustrating an example of a computer system configured to provide a video game environment to players of a video game.

Example implementations of the subject matter described in this specification provide systems and methods for tagging video frames, such as video frames in a video game animation, using machine-learning. The described systems and methods enable video frames to be tagged in an accurate manner through the use of the machine-learned frame tagger.

In particular, a machine-learned frame tagger processes input data representing a plurality of video frames, and outputs output data indicative of a tag for each of one or more of the video frames. The output data is used to tag each of the video frames with a tag out of a set of tags. The set of tags may include a "blank" tag, indicating that no particular tag is assigned to the frame, in addition to non-blank tags indicating a particular type of tag. For example, the video frames may be from an animation sequence of a video game, and the tags may be audio tags that are each associated with corresponding audio. When the video game is being played, audio associated with a particular audio tag may be output at appropriate times, e.g. in response to determining that one or more conditions associated with an audio-tagged frame have been met, such as the current frame that is displayed being associated with an audio tag.

In some implementations, the machine-learned frame tagger comprises a "two-level" neural network, wherein a first portion of the neural network processes "frame-level" data (e.g. features relating to a frame) and a second portion of the neural network processes "animation-level data" (e.g. features relating to a sequence of frames). A two-level neural network may generalize better (e.g. more accurately predict tags) for frames of "unseen" animation sequences (e.g. animation sequences that were not used to train the neural network) than existing approaches. Examples of such machine-learned frame taggers are described in relation to FIGS. 3-5.

As an example, for audio tags in a fighting video game, the types of audio tags may include a tag representing that two fighters have made contact in that frame. Sub-types for this tag may indicate which body parts of the fighters have made contact, e.g. a particular sub-type may specify that a hand of a fighter has made contact with the head of another fighter and/or the environment. Many other examples of audio tags for video games will be apparent to those skilled in the art.

In some implementations, the machine-learned frame tagger comprises a hierarchy of machine-learning models. For example, a first machine-learning model of the frame tagger may identify whether a frame should have a tag or not. In particular, the first-machine learning model may be a binary classifier that outputs an indication, for each frame for one or more frames, of a blank tag or a non-blank tag for the frame. A second machine-learning model may process frames for which the first-machine-learning model outputs an indication of a non-blank tag and subsequently output an indication of a particular type of tag for each of these frames. One or more subsequent machine-learning model may process frames for which the second machine-learning model outputs an indication of a particular type of tag and subsequently output an indication of a particular sub-type for the type. Examples of such a hierarchical approach are described in relation to FIG. 7.

Using a hierarchy of machine-learning models to tag video frames may be advantageous in cases where many frames do not require a tag (e.g. where the number of frames with blank tags is expected to be imbalanced when compared to the number of frames with non-blank tags). For example, the first machine-learning model of the hierarchy may be able to accurately predict whether a video frame should have a blank tag or a non-blank tag, and subsequent machine-learning models may be able to accurately predict types of tags (or particular sub-types thereof) for frames with a non-blank tag.

Example Video Game Environment

FIG. 1 illustrates an example of a computer system configured to provide a video game environment 100 to players of a video game. The video game environment 100 is configured to output audio from game audio data 105 at appropriate times while the video game is being played.

The video game environment 100 includes one or more client computing devices 101. Each client computing device 101 is operable by a user and provides a client in the form of gaming application 102 to the user. The client computing device 101 may be configured to communicate with a video game server apparatus including a game server for providing content and functionality to the gaming application 102.

The client computing device 101 can be any computing device suitable for providing the gaming application 102 to the user. For example, the client computing device 101 may be any of a laptop computer, a desktop computer, a tablet computer, a video games console, or a smartphone. For displaying the graphical user interfaces of computer programs to the user, the client computing device includes or is connected to a display (not shown). Input device(s) (not shown) are also included or connected to the client. Examples of suitable input devices include keyboards, touchscreens, mice, video game controllers, microphones and cameras. The client computing device 101 includes an audio output module 106 which outputs audio while the video game is being played.

The gaming application 102 includes a game engine 103. The game engine 103 can be configured to execute aspects of the operation of the gaming application 102 according to game rules. Examples of game rules can include rules for scoring, possible inputs, actions/events, movement in response to inputs, and the like. The game engine 103 may receive user inputs and determine in-game events, such as actions, jumps, runs, throws, attacks, and other events appropriate for the gaming application 102. During runtime operation, the game engine 103 can read user inputs, in-game data, and game state information to determine the appropriate in-game events.

In particular, the game engine 103 is configured to determine in-game audio events. For example, the game engine 103 may continually (e.g. periodically) determine if one or more conditions for each of a set of audio tags are met, and trigger an audio output event for an audio tag if one or more conditions associated with the audio tag are met. Determining whether one or more conditions are met may comprise determining features associated with a particular frame of the video game. Audio corresponding to the determined audio tag is selected from game audio data 105 and is subsequently output by audio output module 106. In some cases, game engine 103 may determine in advance that one or more conditions associated with an audio tag will be satisfied, and may cause storage of an indication that audio corresponding to the audio tag should be output at a future period.

The association between the one or more conditions (e.g. features relating to a frame of the video game) of an audio tag and the audio tag itself may be pre-determined (e.g. determined before deployment of the gaming application 102) through use of frame tagger models described herein. For example, frame taggers described herein may be used to automatically tag video frames with audio tags. However, it will be appreciated that frame tagger models described herein may be used to determine associations for any suitable tag (e.g. in addition to, or in lieu of, audio tags) for video frames.

The gaming application 102 comprises game content 104 accessed while the video game is being played by the player. The game content includes game audio data 105 and other assets (not displayed) such as markup-language files, scripts, images and music. Game audio data 105 may comprise associations between one or more audio tags and corresponding audio for each of the audio tags. When game engine 103 determines a particular audio tag and triggers an audio output event, the corresponding audio for the audio tag is selected from game audio data 105 and subsequently output by audio output module 106 of the client computing device 101. Audio may be stored in game audio data 105 in a compressed format such as in an MP3 file, a WAV file, etc.

Overview of Using a Machine-Learning Model to Tag Video Frames

Figure 2:
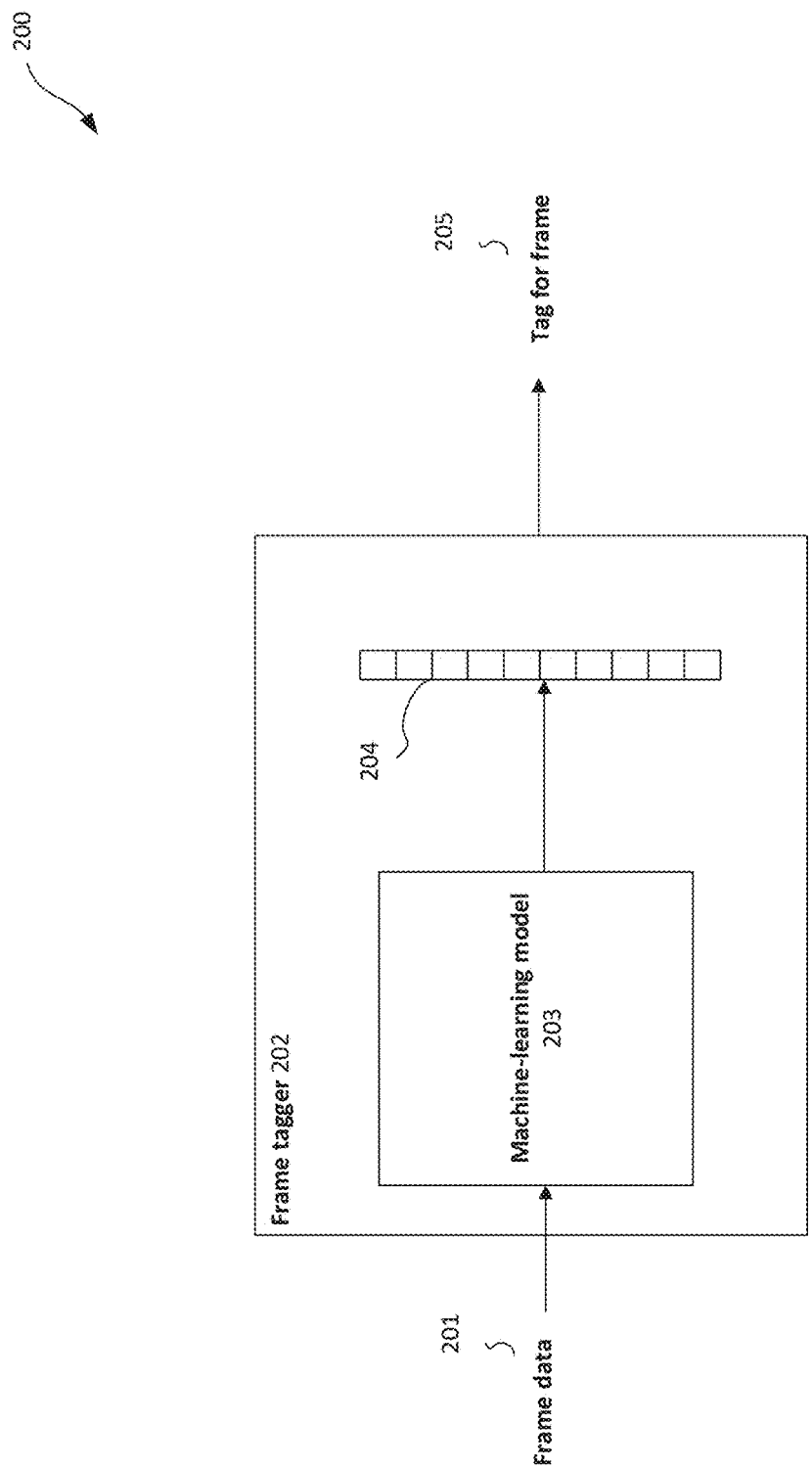
FIG. 2 illustrates an overview of a method for tagging video frames using a machine-learned frame tagger.

FIG. 2 illustrate an overview of an example method 200 for tagging video frames using a machine-learned frame tagger 202. The frame tagger 202 receives frame data 201 for each of one or more frames, and processes the frame data 201 using a machine-learning model 203 to generate a model output 204 for each of one or more of the frames. A tag 205 for each frame may be determined based on the model output 204 for the frame. For example, a computing system may use the model output 204 to automatically determine tags 205 for the frames corresponding to said model output 204. In cases where the frame tagger 202 is used to tag frames for a video game, the method 200 may be performed prior to the video game being deployed for use by players.

Frame data 201 may comprises any information or features relating to an individual video frame. For example, the frame data 201 may represent the state of a video game at a particular frame. This may comprise information relating to one or more keypoints for one or more entities of the video game. For example, the frame data 201 may comprise the positions and/or velocities of the one or more keypoints. The one or more keypoints may comprise joints for skeletal frame(s) of one or more entities of the video game, such as player or non-player characters in the video game. In some embodiments, the frame data 201 for a given frame may be pixel data associated with the frame, i.e. the frame itself. The frame data 201 may be represented by a vector, matrix, tensor, or any other format suitable for processing by the frame tagger 202.

The frame tagger 202 comprises a machine-learning model 203. The machine-learning model may comprise any suitable model, such as random forests, classification/regression trees, logistic regression, support vector machines and/or neural networks. Some examples of suitable machine-learning models will be described in relation to FIGS. 3-6.

The machine-learning model 203 is a model that has been trained using machine learning techniques to tag individual video frames. In general, trained machine-learning models comprise parameters that have been learned after training the machine-learning model on one or more tasks using training data. Example methods of training machine-learning model are described in relation to FIG. 10.

The frame tagger 202 receives frame data 201. The machine-learning model 203 processes the frame data 201 and generates a model output 204 for the frame data 201. The model output 204 comprises data indicative of a tag for each of one or more of the frames associated with the input frame data. Such data may, for example, comprise data that indicates, for each of the one or more frames associated with the input frame data, a probability for each tag in a set of tags. For example, the model output 204 may comprise a vector representing a probability distribution over a set of tags for each frame. In some cases, the model output 204 may be a single number indicating the probability that the frame should have a non-blank tag, for example if the machine-learning model 203 comprises a binary classifier.

The frame tagger, or a further system, may automatically determine a tag 205 for the frame based on the model output 204. For example, a tag indicated to have the highest probability in model output 204 may be selected by the frame tagger as the tag 205 for the frame. In some embodiments, the model output for each frame may be a single tag associated with that frame. A tagged frame may be stored by storing an association between the frame data 201 and the selected tag 205 for the frame.

Although FIG. 2 depicts machine-learning model 203 as processing frame data 201 for a single frame, it will be appreciated that the machine-learning model 203 may be configured to process a batch of frame data corresponding to a respective batch of frames, such as a sequence of frames of an animation. Furthermore, frame tagger 202 may comprise a plurality of machine-learning models 203.

A Two-Level Frame Tagger

Figure 3:
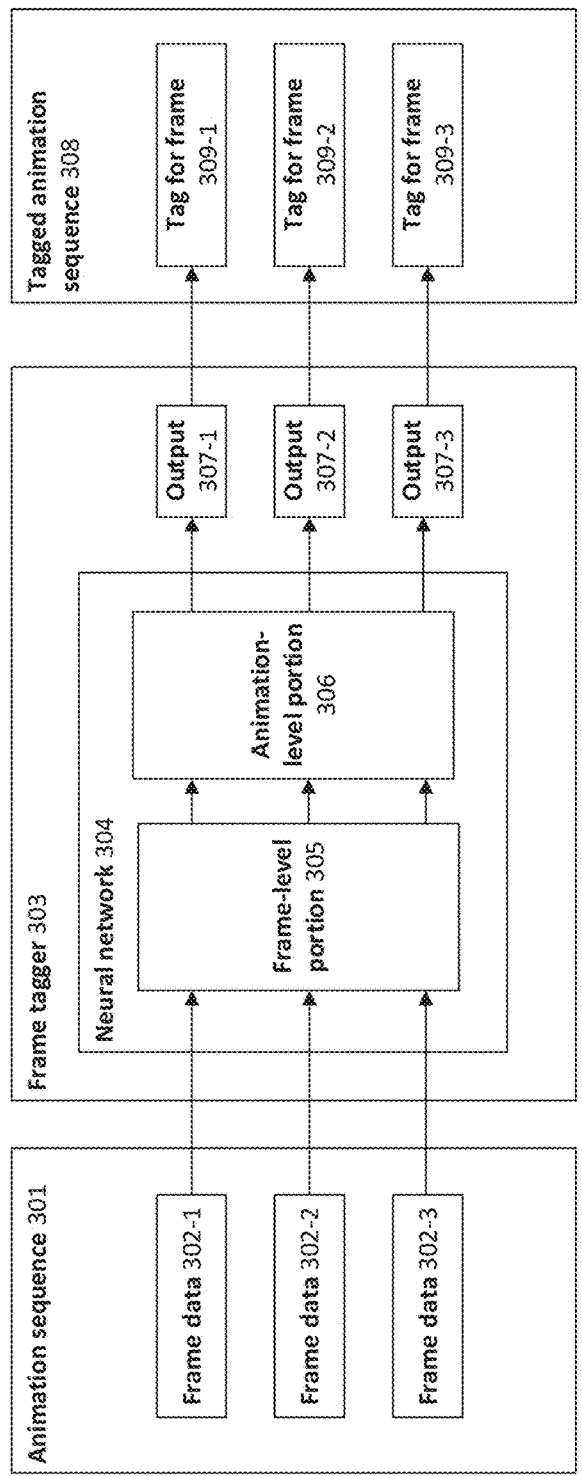
FIG. 3 illustrates an overview of a method for tagging video frames using a "two-level" machine-learned frame tagger.

FIG. 3 illustrates an example frame tagger 303 comprising one or more neural networks 304. The one or more neural networks 304 comprise a first portion 305, (also referred to herein as a "frame-level" portion), and a second portion 306 (also referred to herein as an "animation-level" portion). The one or more neural networks 304 may thus be referred to as "two-level" neural networks. In these examples, the frame tagger 303 individually processes frame data 302 from each frame of a sequence of video frames 301 using the first neural network portion 305 to generate an encoded representation of each frame. The encoded representations are then jointly processed in a sequential manner by the second neural network portion 306 to generate output data 307 indicative of a tag 309 for each of one or more of the video frames. The output data may be used to automatically generate a tagged animation sequence 308, i.e. a sequence of animation frames each associated with a tag.

The frame tagger 303 receives frame data 302-1, 302-2, 302-3 corresponding to an animation sequence 301. The frame data 302 may be denoted $\{x_1, x_2, \ldots x_M\}$, where the index labels the frame associated with the frame data. The animation sequence 301 is a temporally-ordered sequence of video frames. For example, the frame corresponding to frame data 302-2 temporally follows the frame corresponding to frame data 302-1. The frame data 302-1, 302-2, 302-3 comprises, for each frame, a plurality of features associated with that frame. For example, the features may comprise locations and/or velocities of keypoints in the frame.

The first portion 305 of the one or more neural networks 304 is configured to process the frame data 302 of individual frames and generate an encoded representation of the features of each frame of the animation sequence 301. The first portion 305 may thus be referred to as a "frame-level" portion, as features for individual frames are independently processed. The first portion 305 may comprise one or more recurrent neural network layers, such as Long Short-Term Memory (LSTM) layers, as will be described in further detail in relation to FIG. 4. Additionally, or alternatively, the first portion 305 may comprise one or more convolutional layers as will be described in further detail in relation to FIG. 5.

The second portion 306 of neural network 304 sequentially receives a sequence of inputs based on the encoded representations for each frame generated by the first portion 305. Each input of the sequence of inputs to the second portion 306 may comprise a combination of frame data 302 with the encoded representation of the features of the frame generated by the first portion 305. For example, an input of the input sequence to the second portion may comprise a concatenation of frame data 302-1 with the encoded representation for the frame of frame data 302-1. Any suitable combining operation may be performed, such as an addition/summation, concatenation, multiplication, a dot product, etc. The second portion 306 is referred to as an "animation-level" portion as data derived from the animation sequence 301 is sequentially processed together. The second portion 306 may comprise one or more recurrent neural network layers, such as LSTM layers.

The neural network 304 produces output 307-1 for the frame associated with frame data 302-1, output 307-2 for the frame associated with frame data 302-2, and output 307-3 for the frame associated with frame data 302-3. A sequence of tags 309 can be generated from the neural network outputs 307. The sequence of tags 309 comprises a sequences of tags 309-1, 309-2, 309-3, each associated with a frame of the animation sequence 301.

Although FIG. 3 depicts neural network 304 as processing one animation sequence 301, it will be appreciated that neural network 304 may be configured to batch process a plurality of animation sequences 301. Furthermore, animation sequences 301 may comprise frame data 302 for any number of frames.

Figure 4:
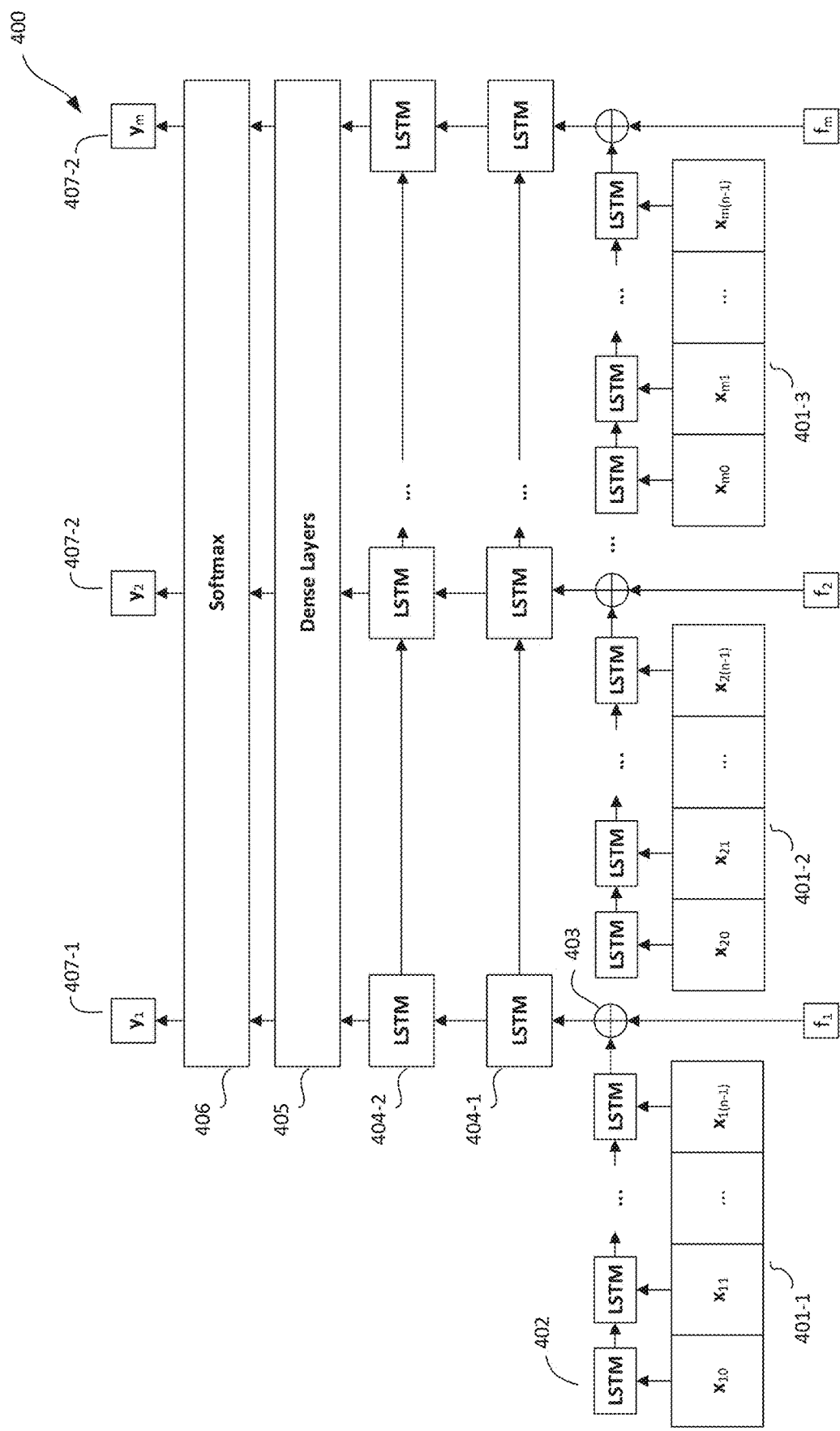
FIG. 4 illustrates an example "two-level" neural network comprising a "frame-level" portion and an "animation-level" portion for use in tagging video frames.

FIG. 4 illustrates an example two-level neural network 400 comprising a frame-level portion and an animation-level portion for use in tagging video frames. FIG. 4 shows an "unrolled" illustration of the neural network 400, showing the processing performed by neural network 400 at different time steps for an input sequence.

The neural network 400 is configured to receive a sequence of sets of frame data 401-1, 401-2, 401-3, each set of frame data 401 corresponding to a frame in a sequence of video frames. FIG. 4 depicts a sequence of frame data 401 for m frames, wherein the frame data, $f_i = \{x_{i1}, x_{i2}, \ldots x_{in}\}$, of each frame has n features. In the example shown, frame data 401-1 forms a first element of the sequence of frame data, frame data 401-2 forms a second element, and frame data 401-3 forms a final element, with any intermediate elements not shown. Frame data 401 for an individual frame may itself be arranged sequentially. For example, frame data 401-1 comprises a sequence of features $x_{10}, x_{11}, \ldots, x_{1(n-1)}$. Each feature may be represented by a number, a vector, or any other suitable representation. For example, in some cases frame data 401 comprises positions and velocities of one or more keypoints of one or more objects that are to be portrayed in the frame. In this case, an individual feature of a frame may be a number that indicates a component of the configuration of the keypoint (e.g. a distance along a particular axis), or may be a vector representing the configuration of the keypoint.

In the example neural network 400 shown, the frame-level portion of the neural network 300 comprises an LSTM layer 402, and a combining operation 403. The animation-level portion of the neural network 400 comprises a plurality of LSTM layers 404-1, 404-2 (in this example, two layers), one or more dense layers 405, and one or more softmax layers 406.

LSTM layers are a type of recurrent neural network layer that include additional aspects such as input gates, output gates and forget gates that control aspects of determining the hidden state that is output by the layer. Although the LSTM layers 402, 404-1, 404-2 are depicted as processing sequences in a forwards direction only, it will be appreciated that these layers may be bi-directional LSTM layers that also process sequences in a backwards direction. Other types of recurrent neural network layer may alternatively be used.

The LSTM layer 402 of the frame level portion processes the features of frame data 401 and generates an encoded representation of the frame features. The encoded representation of the frame features may be determined from a final hidden state, which final hidden state is determined after sequentially processing all of the features of the frame data 401 for an individual frame. The encoded representation of the frame may be represented by a vector or a tensor. In the example shown, only a single LSTM layer is used in the frame-level portion of the neural network, though it will be appreciated that additional LSTM layers may alternatively be used.

The combining operation 403 combines the encoded representation of the frame with the frame data 401 to form an input of an input sequence to the animation-level portion of the neural network 400. The combining operation may be configured to perform a concatenation, an addition, a multiplication (such as an element-wise multiplication), a dot product, or any other suitable combining operation.

LSTM layer 404-1 receives inputs that are determined from the frame-level portion of the neural network 400. LSTM layer 404-1 processes these inputs and produces outputs that form an input sequence to LSTM layer 404-2. LSTM layer 404-2 outputs, for each frame of the sequence of frame data, a representation of the frame that is conditioned on frame data 401 other frames in the sequence.

The one or more dense layers 405 (otherwise referred to as fully-connected layers) process the output produced by LSTM layer 404-2 for each frame, and produces an output for the frame. This output is processed by a softmax layer 406 which generates, for the frame, a neural network output 407 indicating a probability for each tag of a set of tags. For example, output 407-1 corresponds to frame data 401-1, output 407-2 corresponds to frame data 401-2, and output 407-3 corresponds to frame data 401-3. Each output 407 may, for example, be represented by a vector.

In some cases, the softmax layer 406 may be replaced by a logistic regression layer, e.g. if the neural network 400 is a binary classifier.

Figure 5:
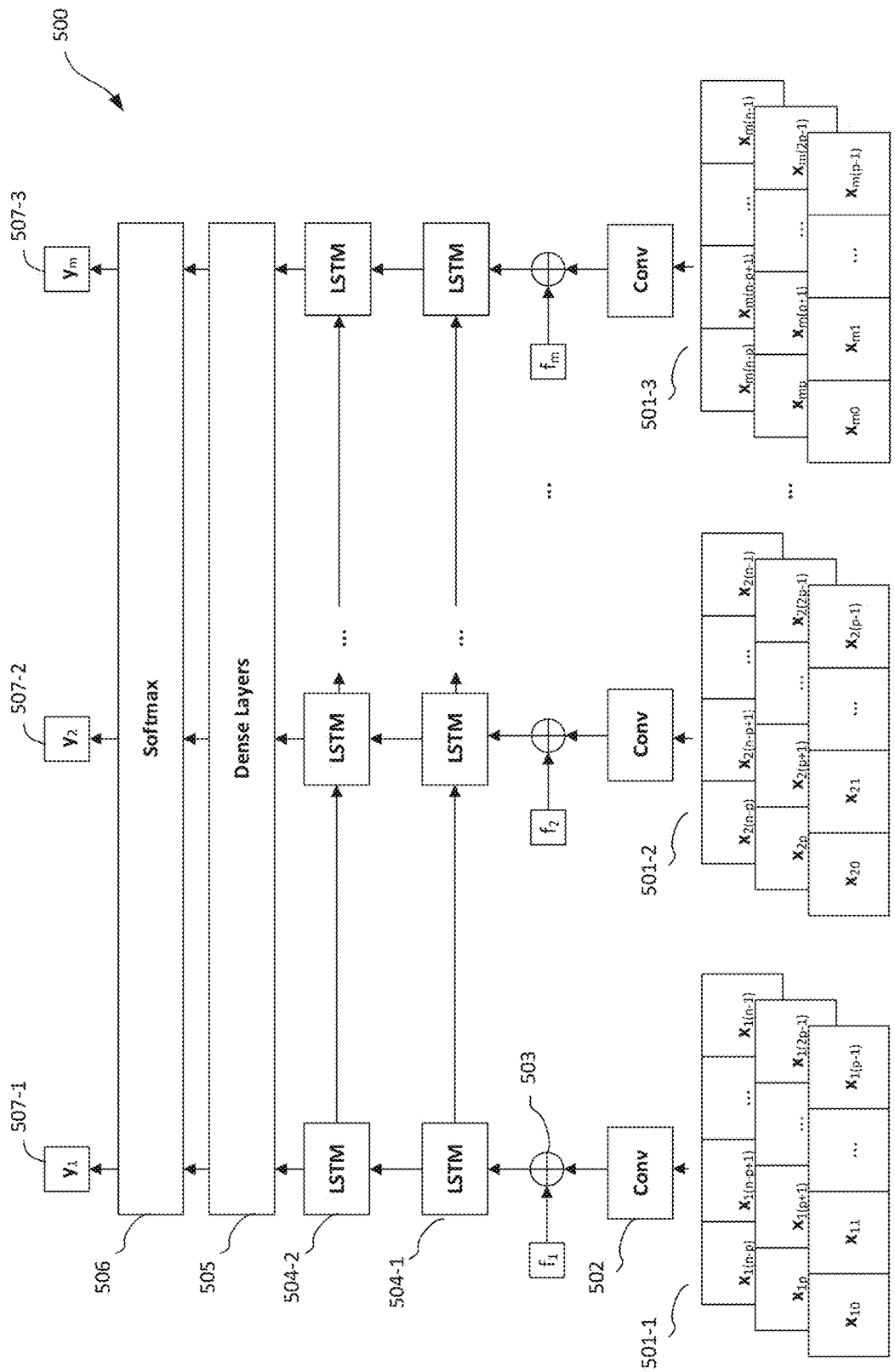
FIG. 5 illustrates another example "two-level" neural network comprising a "frame-level" portion and an "animation-level" portion for use in tagging video frames.

FIG. 5 illustrates a further example two-level neural network 500 comprising a frame-level portion and an animation-level portion for use in tagging video frames. FIG. 5 shows an "unrolled" illustration of the neural network 500, showing the processing performed by neural network 500 at different time steps for an input sequence.

The neural network 500 is configured to receive a sequence of frame data 501-1, 501-2, 501-3. FIG. 5 depicts a sequence of frame data for m frames, wherein the frame data of each frame has n features. In the example shown in FIG. 5, frame data 501-1 forms a first element of the sequence of frame data, frame data 501-2 forms a second element, and frame data 501-3 forms a final element. As shown in FIG. 5, features of the frame data 501 are arranged in channels. For example, a first channel may correspond to positions (or a component thereof, such as position along a particular axis) for one or more keypoints of one or more objects in a video, and a second channel may correspond to velocities for the one or more keypoints. As another example, a first channel may correspond to positions and/or velocities for keypoints of a first object, and a second channel may correspond to positions for keypoints of a second object. As a further example, each channel may correspond to the positions and/or velocities of a single keypoint.

In these embodiments, the frame-level portion of the neural network 500 comprises one or more convolutional layers 502, and a combining operation 503. The animation-level portion of the neural network 500 comprises two LSTM layers 504-1, 504-2, one or more dense layers 505, and one or more softmax layer 506.

The one or more convolutional layers 502 processes the features of frame data 501 and generates an encoded representation of the frame.

Combining operation 503 combines the encoded representation of the frame with the frame data 501 itself to form an input of an input sequence to the animation-level portion of the neural network 500. The combining operation may be configured to perform a concatenation, an addition, a multiplication (e.g. elementwise multiplication), a dot product, or any other suitable combining operation.

LSTM layer 504-1 receives inputs that are determined from the frame-level portion of the neural network 500. The output of the frame-level portion of the neural network may be directly input into the animation-level portion. The first LSTM layer 504-1 processes these inputs and produces outputs that form an input sequence to a second LSTM layer 504-2, and so on if further LSTM layers are present. In the example shown, the second LSTM layer 504-2 outputs, for each frame of the sequence of frame data, a representation of the frame that is conditioned on frame data 501 for other frames in the sequence.

The one or more dense layers 505 process the output produced by final LSTM layer 504-2 for each frame, and produces an output for the frame. This output is processed by a softmax layer 506 which generates, for the frame, a neural network output 507 indicating a probability for each tag of a set of tags. For example, output 507-1 corresponds to frame data 501-1, output 507-2 corresponds to frame data 501-2, and output 507-3 corresponds to frame data 501-3. Each output 507 may be represented by a vector.

In some cases, the softmax layer 506 may be replaced by a logistic regression layer, e.g. if the neural network 500 is a binary classifier.

An RNN Based Frame Tagger

Figure 6:
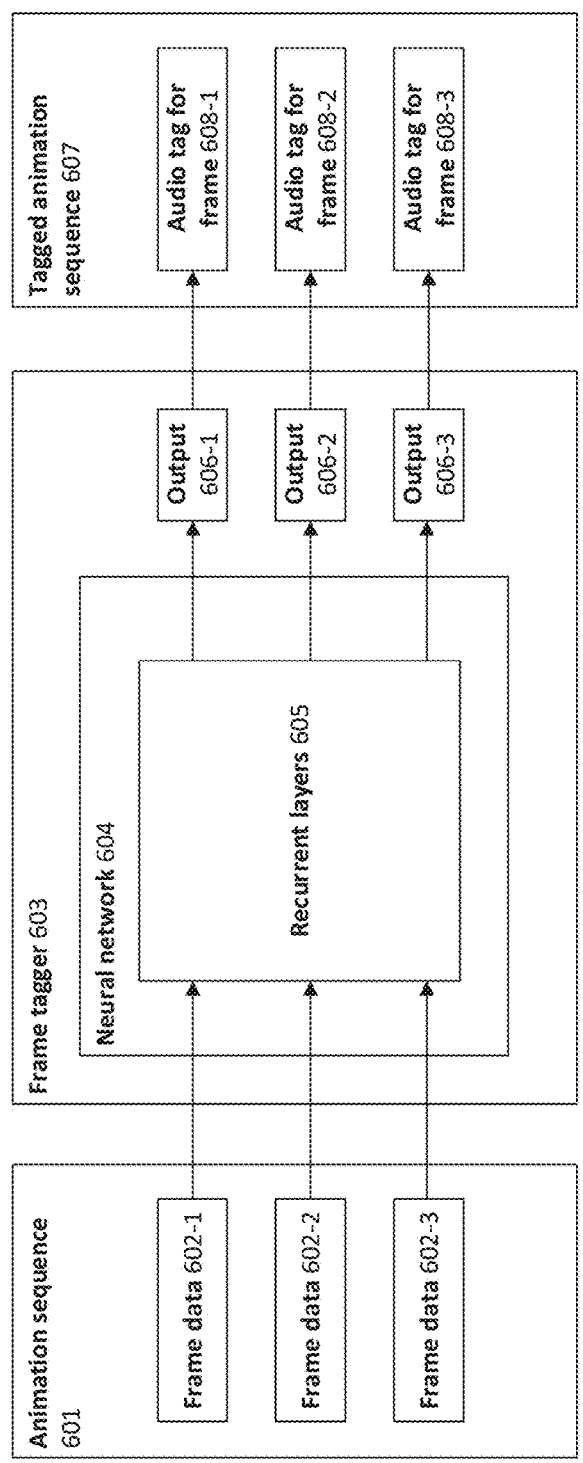
FIG. 6 illustrates an overview of a method for tagging video frames of a video game using a machine learning model comprising a plurality of recurrent layers.

FIG. 6 illustrates an example method 600 of tagging a sequence of frames using a frame tagger 603 comprising a neural network 604 that comprises a plurality of recurrent neural network layers 605. In the embodiment displayed in FIG. 6, the tags for frames of animation sequences are audio tags 608-1, 608-2, 608-3 for a video game. One or more audio tags each indicate a type of audio that is to be output for a frame of the video game starting from when that frame is displayed. A blank audio tag may indicate that none of the types of audio should be output for a frame. In the example shown in FIG. 6, the frame tagger 603 comprises a neural network 604 comprising a plurality of recurrent layers 605, and takes as input animation frames 602 from a video game animation sequence 601. The input animation frames 602 are jointly processed in a sequential manner by the neural network 604 using the recurrent layers 605 to generate output data 606 indicative of a tag 608 for each of the frames.

The frame tagger 603 receives an animation sequence 6$oi$ represented as a sequence of frame data 602-1, 602-2, 602-3. The neural network 604 sequentially processes the frame data 602 for frames of the animation sequence 601 using recurrent neural network layers 605.

Each recurrent layer 605 comprises a hidden state that is updated as the neural network 604 sequentially processes frame data 602 input to the neural network 604. For each time step of a plurality of time steps of the input data, a recurrent layer 605 receives its hidden state from the previous time step, and an input to the recurrent layer for the current time step. A recurrent layer processes its previous hidden state and the current input in accordance with its parameters and generates an updated hidden state for the current time step. For example, recurrent layer may apply a first linear transformation to the previous hidden state and a second linear transformation to the current input and combine the results of the two linear transformations e.g. by adding the two results together. The recurrent layer may apply a non-linear activation function (e.g. a tan h activation function, a sigmoid activation function, a ReLU activation function, etc.) to generate an updated hidden state for the current time step.

The neural network 304 produces output 606-1 associated with frame data 602-1, output 606-2 associated with frame data 602-2, and output 606-3 associated with frame data 602-3. A tagged animation sequence 607 is generated from the neural network outputs 606. The tagged animation sequence 607 comprises a sequences of audio tags 608-1, 608-2, 608-3 for the frames of the animation sequence 601. The tagged animation sequence 607 may indicate an association between the audio tags 608 determined by the frame tagger 603, and the frame associated with the corresponding frame data 602. For example, the frame associated with frame data 602-1 may correspond to audio tag 608-1, the frame associated with frame data 602-2 may correspond to audio tag 608-2, and the frame associated with frame data 602-3 may correspond to audio tag 608-3.

Although FIG. 6 depicts a neural network 604 as processing one animation sequence 601, it will be appreciated that neural network 604 may be configured to batch process a plurality of animation sequences 601 concurrently. Furthermore, animation sequences 601 may comprise frame data 602 for any number of frames of an animation sequence 601.

Hierarchical Frame Tagger

Figure 7:
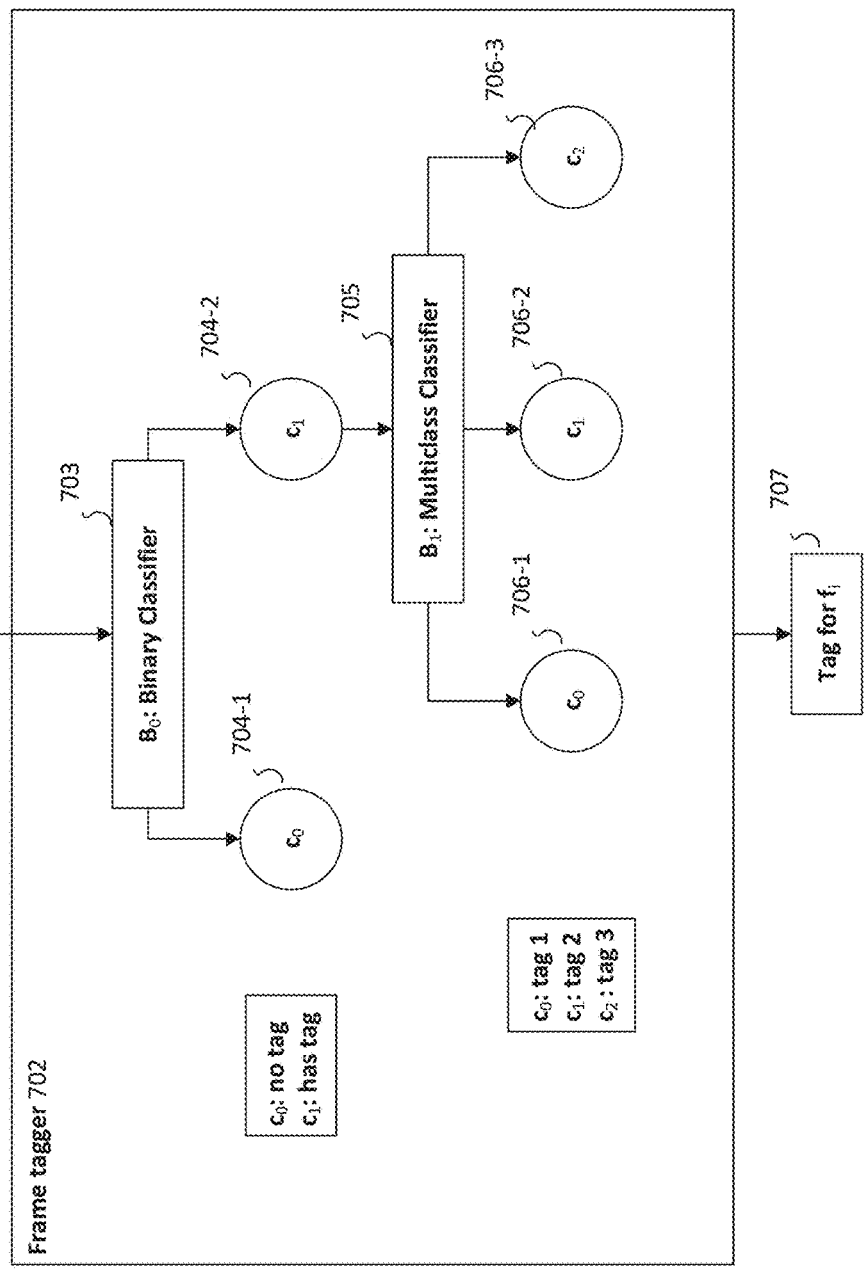
FIG. 7 illustrates an example method for tagging video frames using a frame tagger comprising a hierarchy of classifiers.

FIG. 7 illustrates an overview of an example method 700 for tagging video frames using a frame tagger 702 comprising hierarchy of classifiers. Each classifier of the hierarchy of classifiers comprises a machine-learning model. For example, one or more of the classifiers may comprise a neural network, such as a two-level neural network or recurrent neural network described previously. The input to each classifier is frame data 701 for one or more frames.

In the example shown in FIG. 7, the frame tagger comprises a binary classifier 703, and a multiclass classifier 705. The binary classifier 703 is configured to output an indication of whether a frame has a tag or not, as indicated by classes 704-1, 704-2. The binary classifier 703 may provide a tag for frames belonging to class 704-1 in the form of a blank tag. The multiclass classifier 705 is configured to output an indication of a particular type of tag, as indicated by classes 706-1, 706-2, 706-3, for frames which the binary classifier outputs an indication of a non-blank tag (i.e. belonging to class 704-2).

The frame tagger 702 may comprise further subsequent classifiers. For example, if class 706-2 comprises subclasses (corresponding to sub-types of tags), then a subsequent classifier may be configured to output an indication of a particular sub-type for the type of tag for frames which the multiclass classifier 705 outputs an indication of a tag for class 706-2.

The indications of tags (or sub-types thereof) output by the hierarchy of classifiers is used to determine a tag 707 for the frame. The tag 707 may be determined based on the output of a "final" classifier used to process the frame.

Generating a Training Dataset

Figure 8:
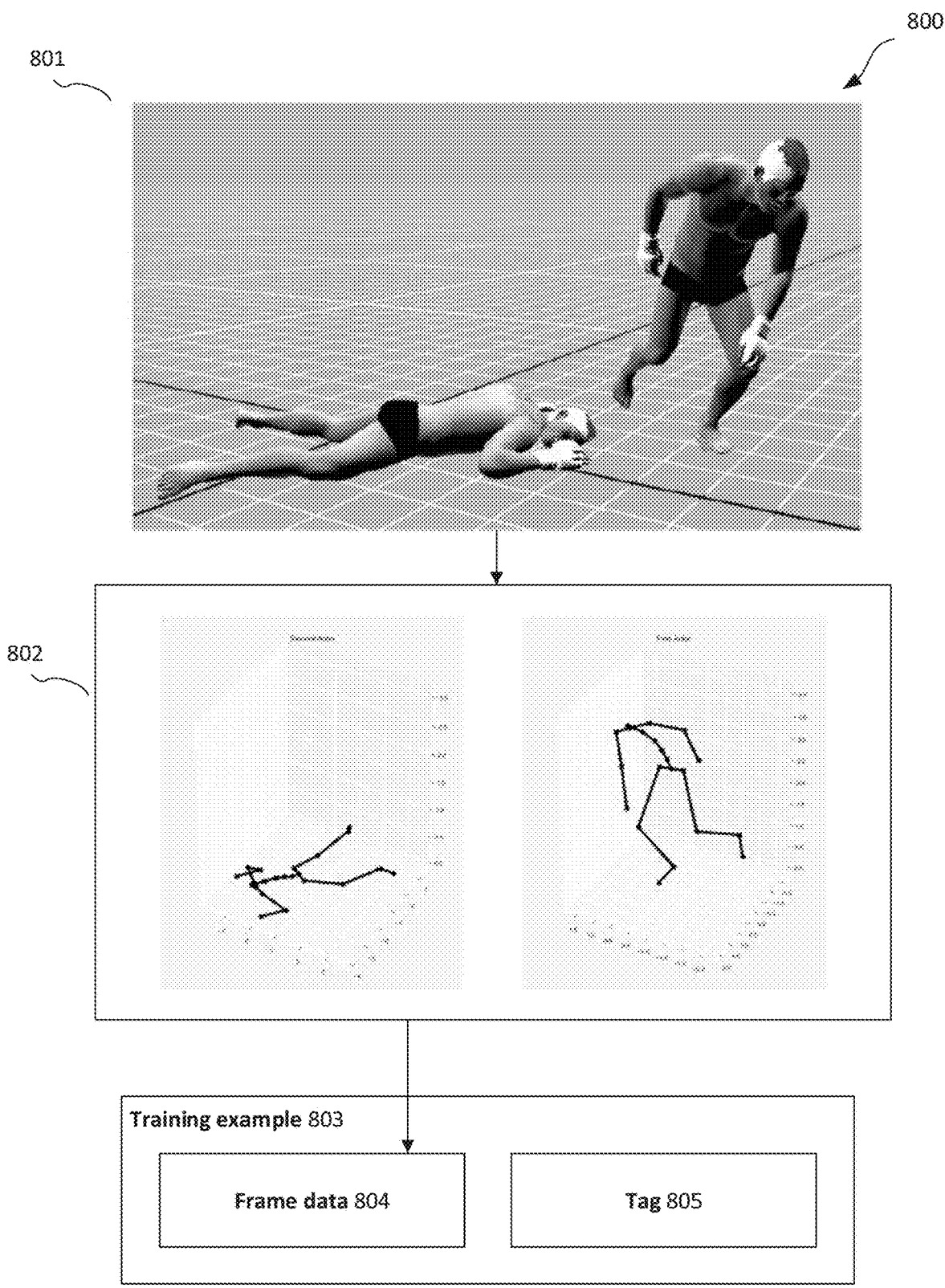
FIG. 8 illustrates an example method for obtaining training data for use in training machine-learning models to tag video frames.

FIG. 8 illustrates an example method 800 for obtaining training data for use in training machine-learning models to tag video frames. The method 800 is described in relation to obtaining training data for frames of a fighting video game.

The method 800 comprises obtaining one or more frames 801 of an animation sequence. The frame 801 portrays two fighters in a match of a video game. The animation sequence may be determined from animation software used when developing video games. Frame data 804 is determined from the frame 801. The frame data in the example portrayed in FIG. 8 comprises positions 802 of one or more joints of the skeletal frames of each fighter. The frame data may further comprise velocities for the one or more joints.

The frame 801 is associated with a ground-truth tag 805 which forms, in combination with the frame data 804 for the frame 801, a training example 803. Training examples may comprise a sequence of frame data 804 for a corresponding sequence of frames. Each frame in the sequence of frame data 804 may be associated with a respective tag 805. A training dataset is formed from a plurality of training examples 803. The training dataset may be divided into a subset of training examples 803 that are used to train a machine-learning model, and a subset of training examples that are used to validate a trained machine-learning model.

Training a Frame Tagger

Figure 9:
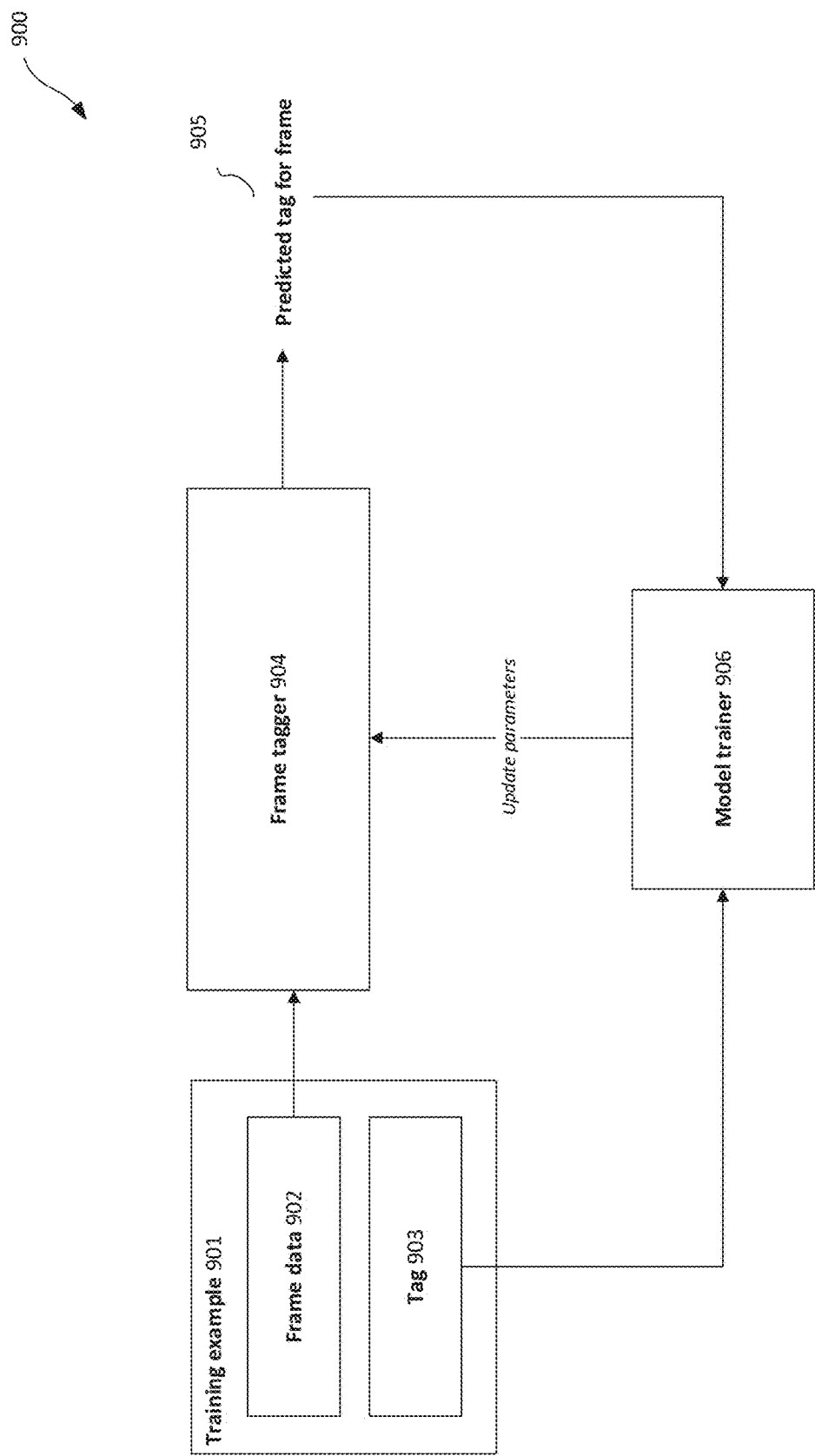
FIG. 9 illustrates an example method for training a frame tagger for use in tagging video frames.

FIG. 9 illustrates an overview of an example method goo for training a frame tagger 904 for use in tagging video frames. Frame data 902 from a training example 901 is input into a frame tagger 904, which processes the input frame data to generate one or more predicted tags 905 for the frames associated with the frame data 902. The predicted tags 905 are compared to corresponding ground truth tags 903 by a model trainer 906, which determines updates to parameters of the frame tagger 904 based on the comparison.

FIG. 9 depicts training using a single training example 901, however it will be appreciated that any number of training examples may be used to train frame tagger 904. The training example comprises frame data 902 for one or more frames of an animation sequence, and a respective one or more ground truth tags 903, each associated with the frame data 902 of a frame in the animation sequence.

The frame tagger 904 processes the frame data of a training example 902 in accordance with a current set of parameters of the frame tagger 904, and generates an output that indicates a predicted tag 905 for each frame. The frame tagger 904 may comprise any of the machine-learning models previously described, including a hierarchy of machine-learning models as described in relation to FIG. 7.

The model trainer 906 receives the ground-truth tag 903 for each frame of the training example, and the corresponding output indicating predicted tags 905 for the one or more frames, and updates parameters of the frame tagger 904 with a goal of optimizing an objective function. The objective function may comprise a loss that is in dependence on a comparison between: (i) the ground-truth tag 903 of each frame, and (ii) the corresponding frame tagger output 905 indicating a predicted tag for the frame. For example, the loss may comprise a cross-entropy loss. Alternatively, the loss may comprise a logistic regression loss, or any other suitable error/loss function.

The parameters of the frame tagger 904 may be updated by applying an optimization procedure to the objective function. Any suitable optimization procedure may be used. For example, the optimization procedure may use gradient-based methods, such as stochastic gradient descent, mini-batch gradient descent, or batch gradient descent, including momentum-based methods such as Adam, RMSProp, and AdaGrad. In some embodiments, parameter updates are determined based on the output of a batch of training examples.

The training process is iterated until a threshold condition is satisfied. The threshold condition may, for example, comprise a threshold number of training epochs on a set of training data. Alternatively, or additionally, the threshold condition may be a threshold performance being reached on a validation dataset.

In cases where the frame tagger 904 comprises a hierarchy of classifiers, as described in relation to FIG. 5, the model trainer 906 may be configured to mask losses (i.e. not take these losses into account when updating model parameters) for certain frames processed by a classifier. For example, if a frame does not have a tag, but is still processed by a multiclass classifier that is to be only trained with tagged data, then the loss determined from output of the multiclass classifier for this frame may be masked from the overall loss for the multiclass classifier.

Example Method of Tagging Frames

Figure 10:
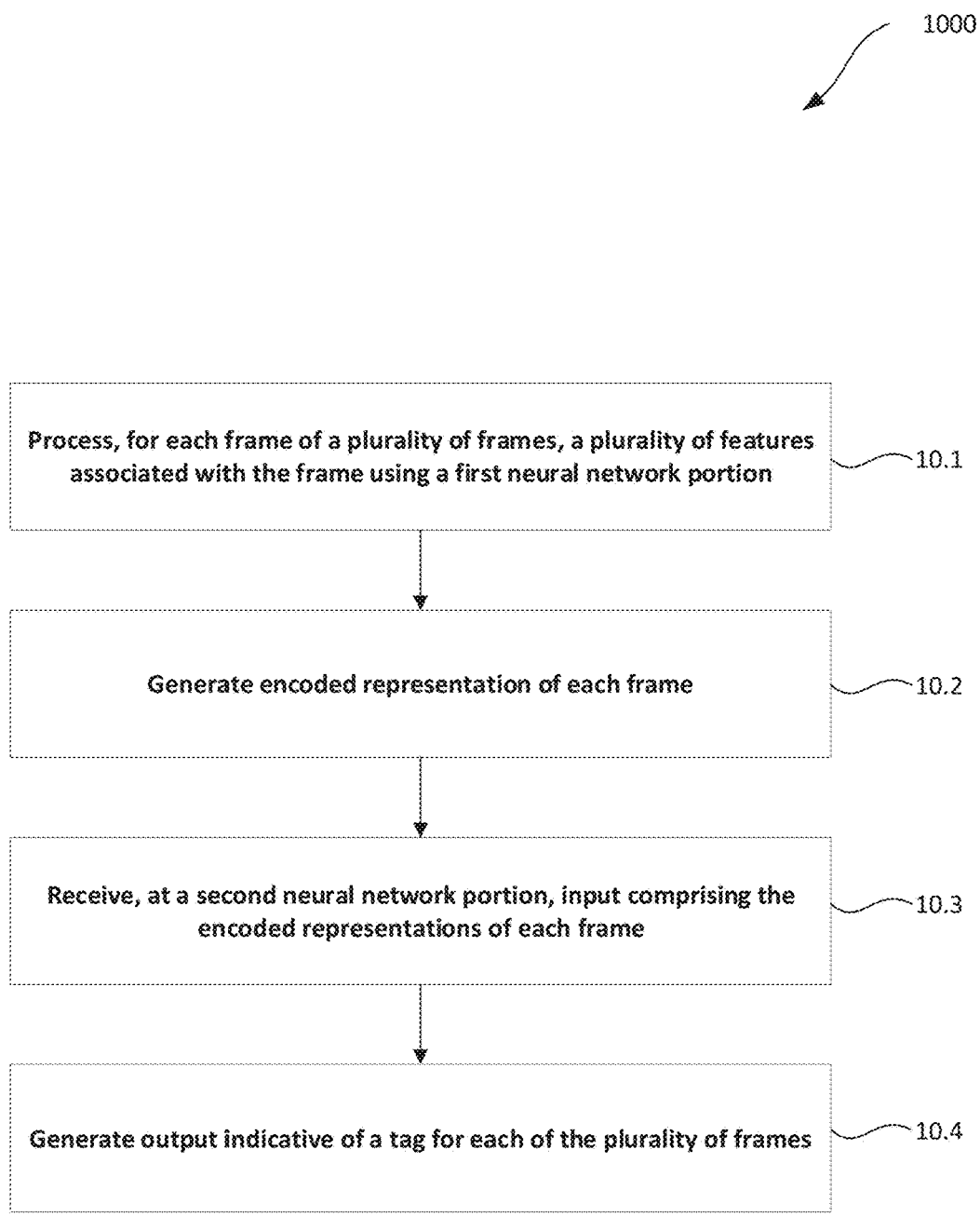
FIG. 10 is a flow diagram illustrating an example method of tagging video frames.

FIG. 10 is a flow diagram illustrating an example method 1000 of tagging video frames. The method 1000 generates, using a frame tagging model, a tag for each of the plurality of frames of an animation sequence. The method may be implemented by a computing system/apparatus, such as that described in relation to FIG. 13.

The frame tagging model comprises a first neural network portion and a second neural network portion. The first portion of the frame tagging model may comprise one or more recurrent neural network layers and/or one or more convolutional neural network layers. The second portion of the frame tagging model may comprise one or more recurrent neural network layers. The second portion of the frame tagging model may further comprise, subsequent to the one or more recurrent neural network layers, one or more dense layers and a softmax layer. The softmax layer may output, for each frame in the animation sequence of the video game, a probability distribution over a plurality of tags.

In step 10.1, for each frame of a plurality of frames, a plurality of features associated with the frame is processed using a first neural network portion. The plurality of features associated with each frame may comprise positions and/or velocities for one or more keypoints of one or more objects of the video game present in the plurality of frames. The one or more keypoints may comprise one or more joints of a skeletal frame for one or more entities of the video game.

In step 10.2, an encoded representation is generated for each frame.

In step 10.3, an input comprising the encoded representations of each frame is received at a second neural network portion. The input to the second portion of the frame tagging model may further comprise the plurality of frames of the animation sequence. The encoded representation of each of the frames of the animation sequence may be concatenated with the plurality of features associated with the frame prior to input into the second portion of the frame tagging model.

In step 10.4, output indicative of a tag is generated for each of the plurality of frames. The tag for each frame may comprise an audio tag out of a set of audio tags, the set of audio tags may include a blank audio tag.

A tag for each frame may be automatically determined by a computing system based on the output of the frame tagging model. An association between each frame and its corresponding tag determined in this way may be stored in a memory for later use when displaying the frames of the animation. In some implementations, the automatic determination of the tag for each frame from the output may be performed by the frame tagging model itself, or the computing system on which the frame tagging model is being run. Alternatively, the output of the frame tagger model may be stored alongside information identifying the frames to which it relates. Subsequently, this stored data may be used by a separate computing system to automatically tag the frames of the animation.

The method 1000 may further comprise displaying, using a display device, the plurality of frames of an animation sequence of the video game during a video game session; and causing output of audio associated with an audio tag from an audio device when a frame associated with the audio tag is displayed.

Figure 11:
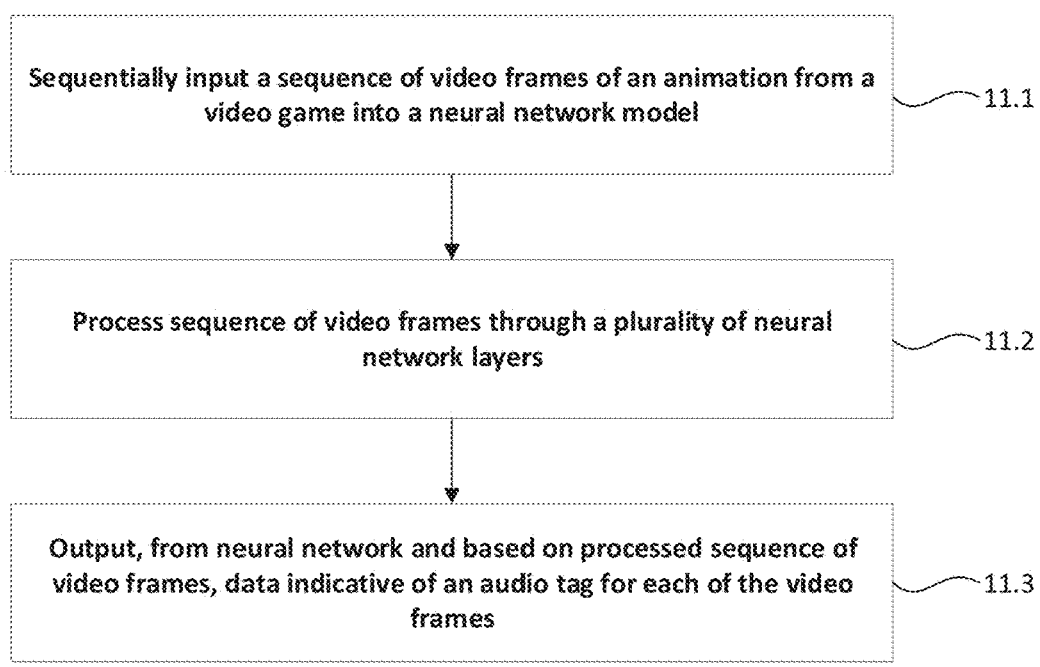
FIG. 11 is a flow diagram illustrating an example method of determining audio tags for frames of a video game.

FIG. 11 is a flow diagram illustrating an example method 1101 of determining audio tags for frames of a video game. The method may be implemented by a computing system/apparatus, such as that described in relation to FIG. 13.

In step 11.1, a sequence of video frames of an animation from a video game is sequentially inputted into a neural network model. The neural network comprises one or more recurrent neural network layers. The one or more recurrent neural network layers may comprise a long short-term memory layer. The neural network may further comprise, subsequent to the one or more recurrent neural network layers, one or more dense layers and a softmax layer. The softmax layer may output, for each frame in the animation sequence of the video game, a probability distribution over a plurality of tags.

Sequentially inputting the sequence of video frames into the neural network may comprises: concatenating each video frame with an encoded representation of features extracted from that video frame to form a set of input data; and inputting the input data into the neural network. The encoded representation of features of each of the video frames may be generated by applying a further neural network to features extracted from the video frame. The further neural network may comprise a recurrent neural network or a convolutional neural network. The features extracted from the video frame may comprise positions and/or velocities for one or more keypoints of one or more objects of the video game present in the plurality of frames. The one or more keypoints may comprises one or more joints of a skeletal frame for one or more entities of the video game.

In step 11.2, the sequence of video frames is processed through a plurality of neural network layers.

In step 11.3, data indicative of an audio tag for each of the video frames is output from the neural network, based on the processed sequence of video frames.

The method 1100 may further comprise displaying, using a display device, the plurality of frames of an animation sequence of the video game during a video game session; and causing output of audio associated with an audio tag from an audio device when a frame associated with the audio tag is displayed.

Figure 12:
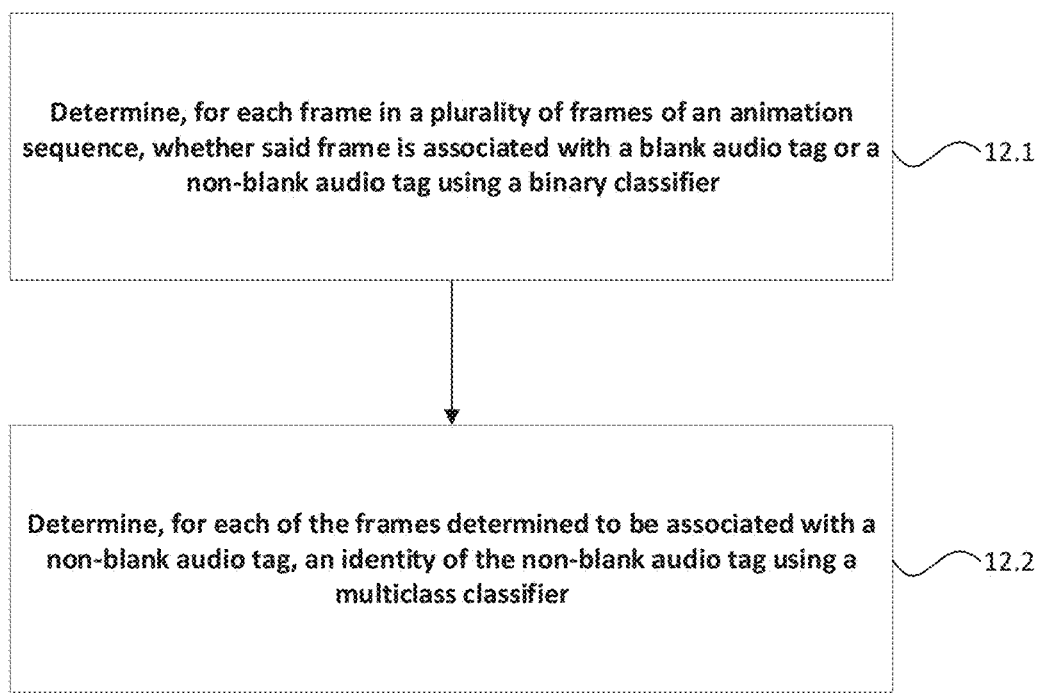
FIG. 12 is a flow diagram illustrating another example method of determining audio tags of video frames for a video game.

FIG. 12 is a flow diagram illustrating another example method 1200 of determining audio tags of video frames for a video game. The method may be implemented by a computing system/apparatus, such as that described in relation to FIG. 13.

In step 12.1, for each frame in a plurality of frames of an animation sequence of the video game, the method determines whether said frame is associated with a blank audio tag or a non-blank audio tag using a binary classifier. The classifier may, for example, be a classier as described in relation to FIG. 10 or 11.

In step 12.2, for each of the frames determined to be associated with a non-blank audio tag, an identity of the non-blank audio tag is determined using a multiclass classifier.

The multiclass classifier may comprise a neural network. The method 1200 may further comprise: sequentially inputting a sequence of video frames of an animation from a video game into the neural network model. The sequence of video frames may be processed through a plurality of neural network layers. Data indicative of an audio tag for each of the video frames may be outputted from the neural network, based on the processed sequence of video frames. The neural network may comprise one or more recurrent neural network layers.

Example Systems and Apparatus

Figure 13:
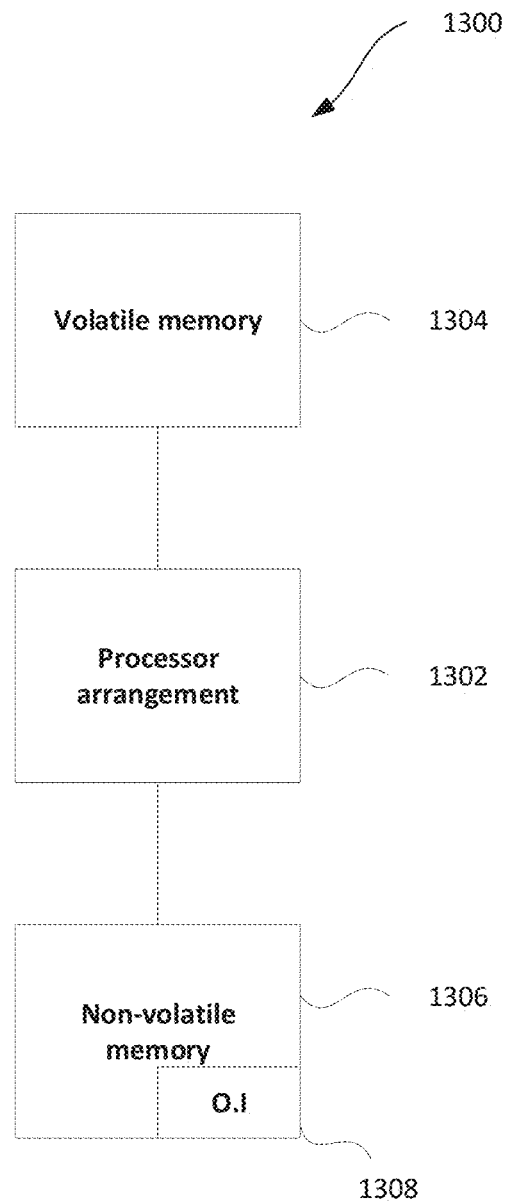
FIG. 13 shows a schematic example of a system/apparatus for performing any of methods described herein.

FIG. 13 shows a schematic example of a system/apparatus for performing any of methods described herein. The system/apparatus shown is an example of a computing device. It will be appreciated by the skilled person that other types of computing devices/systems may alternatively be used to implement the methods described herein, such as a distributed computing system.

The apparatus (or system) 1300 comprises one or more processors 1302. The one or more processors control operation of other components of the system/apparatus 1300. The one or more processors 1302 may, for example, comprise a general purpose processor. The one or more processors 1302 may be a single core device or a multiple core device. The one or more processors 1302 may comprise a central processing unit (CPU) or a graphical processing unit (GPU). Alternatively, the one or more processors 1302 may comprise specialised processing hardware, for instance a RISC processor or programmable hardware with embedded firmware. Multiple processors may be included.

The system/apparatus comprises a working or volatile memory 1304. The one or more processors may access the volatile memory 1304 in order to process data and may control the storage of data in memory. The volatile memory 1304 may comprise RAM of any type, for example Static RAM (SRAM), Dynamic RAM (DRAM), or it may comprise Flash memory, such as an SD-Card.

The system/apparatus comprises a non-volatile memory 1306. The non-volatile memory 1306 stores a set of operation instructions 1308 for controlling the operation of the processors 1302 in the form of computer readable instructions. The non-volatile memory 1306 may be a memory of any kind such as a Read Only Memory (ROM), a Flash memory or a magnetic drive memory.

The one or more processors 1302 are configured to execute operating instructions 1308 to cause the system/apparatus to perform any of the methods described herein. The operating instructions 1308 may comprise code (i.e. drivers) relating to the hardware components of the system/apparatus 1300, as well as code relating to the basic operation of the system/apparatus 1300. Generally speaking, the one or more processors 1302 execute one or more instructions of the operating instructions 1308, which are stored permanently or semi-permanently in the non-volatile memory 1306, using the volatile memory 1304 to temporarily store data generated during execution of said operating instructions 1308.

Implementations of the methods described herein may be realised as in digital electronic circuitry, integrated circuitry, specially designed ASICs (application specific integrated circuits), computer hardware, firmware, software, and/or combinations thereof. These may include computer program products (such as software stored on e.g. magnetic discs, optical disks, memory, Programmable Logic Devices) comprising computer readable instructions that, when executed by a computer, such as that described in relation to FIG. 13, cause the computer to perform one or more of the methods described herein.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

Any system feature as described herein may also be provided as a method feature, and vice versa. As used herein, means plus function features may be expressed alternatively in terms of their corresponding structure. In particular, method aspects may be applied to system aspects, and vice versa.

Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or used independently.

Although several embodiments have been shown and described, it would be appreciated by those skilled in the art that changes may be made in these embodiments without departing from the principles of this disclosure, the scope of which is defined in the claims.

The invention claimed is:

1. A computer-implemented method of tagging video frames of a video game, the method comprising:
generating, using a frame tagging model, a tag for each of a plurality of frames of an animation sequence, wherein the frame tagging model comprises:
a first neural network portion configured to process, for each frame of the plurality of frames, a plurality of features associated with the frame to generate an encoded representation for the frame; and
a second neural network portion configured to receive input comprising a combined representation generated by respectively combining the encoded representation for each frame with the corresponding plurality of features associated with the frame, to generate output indicative of the tag for each of the plurality of frames, wherein the tag for each frame comprises an audio tag out of a set of audio tags.

2. The method of claim 1, wherein the encoded representation for each frame of the animation sequence is respectively concatenated with the plurality of features associated with the frame prior to input into the second neural network portion of the frame tagging model.

3. The method of claim 1, wherein the first neural network portion of the frame tagging model comprises one or more recurrent neural network layers and/or one or more convolutional neural network layers.

4. The method of claim 1, wherein the second neural network portion of the frame tagging model comprises one or more recurrent neural network layers.

5. The method of claim 4, wherein the second neural network portion of the frame tagging model further comprises, subsequent to the one or more recurrent neural network layers, one or more dense layers and a softmax layer, wherein the softmax layer outputs, for each frame in the animation sequence, a probability distribution over a plurality of tags.

6. The method of claim 1, wherein the plurality of features associated with each frame comprises positions and/or velocities for one or more keypoints of one or more objects of the video game present in the plurality of frames.

7. The method of claim 6, wherein the one or more keypoints comprises one or more joints of a skeletal frame for one or more entities of the video game.

8. The method of claim 1, wherein the set of audio tags includes a blank audio tag.

9. The method of claim 8, wherein the method further comprises:
displaying, using a display device, the plurality of frames of the animation sequence of the video game during a video game session; and
causing output of audio associated with an audio tag from an audio device when a frame associated with the audio tag is displayed.

10. A non-transitory computer readable medium containing instructions, which when executed by one or more processors, causes the one or more processors to perform a method of determining audio tags for frames of a video game comprising:
sequentially inputting a sequence of video frames of an animation from the video game into a neural network;
processing the sequence of video frames through a plurality of neural network layers, the plurality of neural network layers comprising:
a first neural network portion configured to process, for each video frame of the sequence of video frames, a plurality of features associated with the video frame to generate an encoded representation for the video frame; and
a second neural network portion configured to receive input comprising a combined representation generated by respectively combining the encoded representation for each video frame with the corresponding plurality of features associated with the video frame, to generate data indicative of a tag for each of the video frames; and
outputting, from the neural network and based on the processed sequence of video frames, the data indicative of an audio tag for each of the video frames,
wherein the neural network comprises one or more recurrent neural network layers.

11. The non-transitory computer readable medium of claim 10, wherein the neural network further comprises, subsequent to the one or more recurrent neural network layers, one or more dense layers and a softmax layer, wherein the softmax layer outputs, for each video frame in the animation sequence of the video game, a probability distribution over a plurality of tags.

12. The non-transitory computer readable medium of claim 10, wherein the one or more recurrent neural network layers comprise a long short-term memory layer.

13. The non-transitory computer readable medium of claim 10, wherein combining the encoded representation for each video frame with the corresponding plurality of features associated with the video frame comprises:
concatenating each video frame with an encoded representation of features extracted from that video frame to form the combined representation.

14. The non-transitory computer readable medium of claim 10, wherein the first neural network portion comprises a recurrent neural network or a convolutional neural network.

15. The non-transitory computer readable medium of claim 10, wherein the plurality of features associated with each video frame comprises positions and/or velocities for one or more keypoints of one or more objects of the video game present in the sequence of video frames.

16. The non-transitory computer readable medium of claim 15, wherein the one or more keypoints comprises one or more joints of a skeletal frame for one or more entities of the video game.

17. The non-transitory computer readable medium of claim 10, wherein the method further comprises:
displaying, using a display device, the sequence of video frames of an animation sequence of the video game during a video game session; and
causing output of audio associated with an audio tag from an audio device when a video frame associated with the audio tag is displayed.

* * * * *

UNITED STATES PATENT AND TRADEMARK OFFICE
CERTIFICATE OF CORRECTION

PATENT NO. : 11,625,880 B2
APPLICATION NO. : 17/171240
DATED : April 11, 2023
INVENTOR(S) : Elaheh Akhoundi It is certified that error appears in the above-identified patent and that said Letters Patent is hereby corrected as shown below:

In the Specification

In Column 6, Line 19, delete "illustrate" and insert -- illustrates --, therefor.

In Column 10, Line 63, delete "$6_{oi}$" and insert -- $6_{O1}$ --, therefor.

In Column 12, Line 31, delete "goo" and insert -- 900 --, therefor.

In Column 14, Line 20, delete "1101" and insert -- 1100 --, therefor.

Signed and Sealed this
Tenth Day of October, 2023

Katherine Kelly Vidal
*Director of the United States Patent and Trademark Office*